Oct. 22, 1940.  W. R. HILLS  2,218,792
HOLDER FOR MOPS AND THE LIKE
Filed Oct. 12, 1939
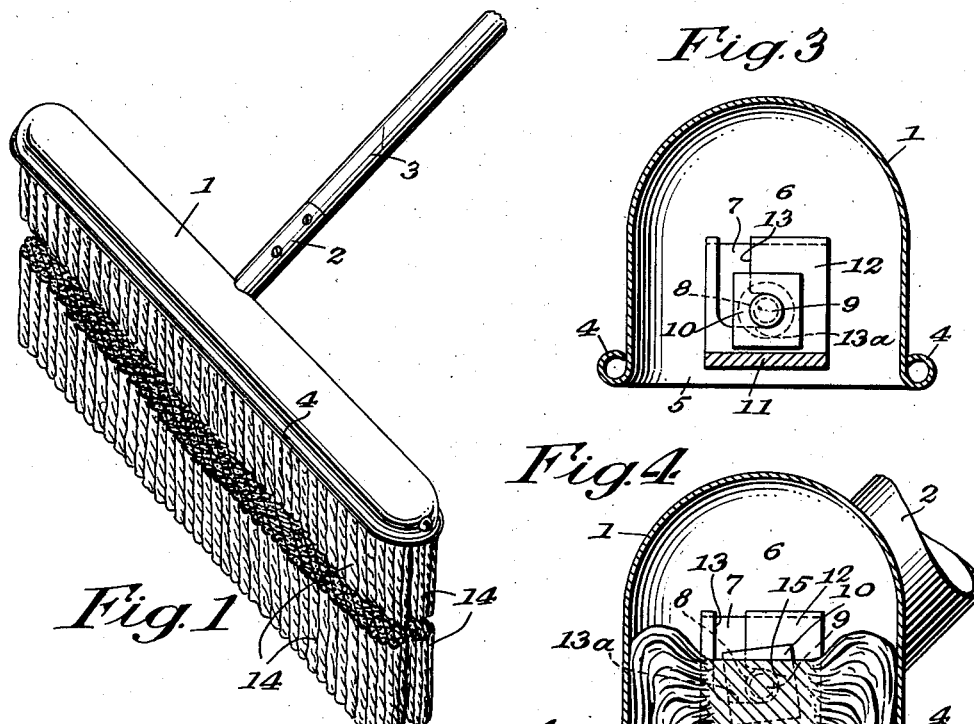
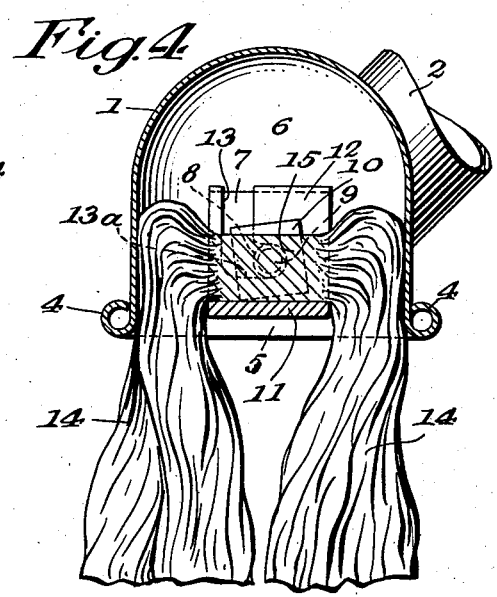
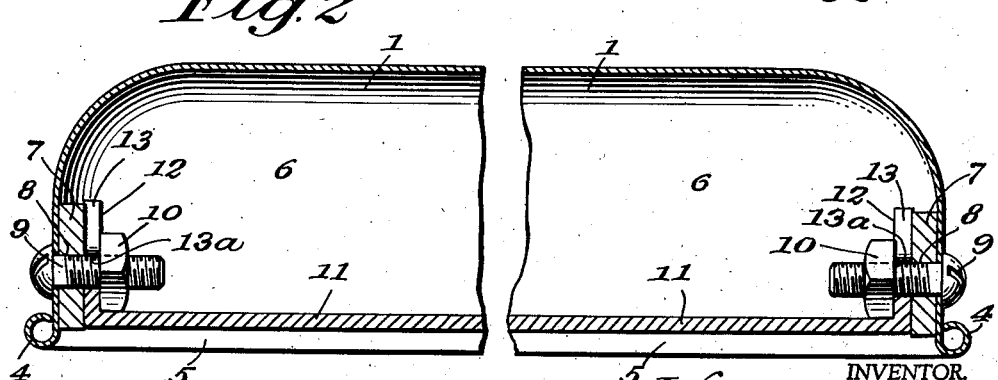
INVENTOR.
Walter R. Hills
BY Spear, Rawlings & Spear
ATTORNEYS.

Patented Oct. 22, 1940

2,218,792

UNITED STATES PATENT OFFICE 2,218,792

HOLDER FOR MOPS AND THE LIKE

Walter R. Hills, Belmont, Mass., assignor to Masury-Young Company, Charlestown, Mass., a corporation of Massachusetts Application October 12, 1939, Serial No. 299,126

3 Claims. (Cl. 15—147)

My present invention relates to a novel holder for such replaceable units as mops and the like.

The frequent servicing of floors and like surfaces results in a relatively short life of the applicator or other unit employed and my invention is directed to a holder permitting such units to be quickly and easily replaced.

In the accompanying drawing, I have shown an embodiment of my invention from which its novel features and advantages will be readily apparent. In the drawing:

Fig. 1 shows a typical device embodying my invention.

Fig. 2 is an enlarged longitudinal section through the holder.

Fig. 3 shows the holder in cross section, and

Fig. 4 is a view similar to Fig. 3, but showing a unit locked in place.

In accordance with my invention, I employ a holder 1 having a socket 2 to receive a handle 3. The holder 1 is preferably formed from thin metal stock beaded as at 4 at the mouth 5 to the chamber 6.

The inner surface of the rounded ends of the holder 1 carry flat faced guides 7. While the holder 1 may be formed to present such guide portions, these may be separately formed and added in any suitable manner to the holder 1 as indicated in the drawing.

The ends of the holder 1 and the guides 7 are provided with apertures 8 to receive the members 9 threaded to receive nuts 10.

At 11, I have shown a lock bar formed with upturned ends 12 formed with open ended slots 13 preferably having at their inner ends laterally extending pockets 13ª. The lock bar 11 is preferably of metal and has a slight resiliency. It is of at least the same length as the distance between the flat faced guides 7 and is preferably slightly longer so that when the bar is assembled with the holder the ends 12 have a spring or snap frictional engagement with the guides 7.

The slots 13 are formed to permit the lock bar to be inserted in the holder 1 longitudinally of the mouth 5 with the threaded members 9 in such a position relative to the bar 11 that the bar 11 holds the nuts 10 against rotation as the members 9 are rotated to release the lock bar 11 or to lock it in place. Where the slots 13 include the lateral pockets 13ª, the threaded members 9 are disposed therein so that the bar 11 can not drop from its proper position.

The replaceable units are shown in Figs. 1 and 4 and it will be noted that these units consist of a plurality of heavy strands 14 on both edges of a central band or web 15. The strands 14 present such a thickness of material that when the bar 11 is locked in place, the units are tightly held thereby as shown in Fig. 4 against the beaded mouth of the holder 1.

When it is desired to remove and replace a unit, the threaded members 9 are rotated to release the lock bar 11 from the holder 1. A new unit is then placed with its central portion 15 over the bar 11 which is then again inserted within the holder 1 and locked in place so that the removal and replacement of the units may be quickly and easily effected.

What I therefore claim and desire to secure by Letters Patent is:

1. A device for holding replaceable mops or like units, said device comprising a hollow holder having an elongated downwardly opening mouth, the end walls of said holder having apertures, a pair of separable threaded members interconnected thorugh each of said apertures, a unit holding member, comprising a base and upturned end portions bearing against the inner faces of said end walls of said holder, said end portions having vertically extending slots provided with laterally disposed portions forming pockets adjacent the base of said unit holding member to receive one of each pair of threaded members when said unit holding member is inserted into the opening mouth of said holder in such a position that one of each pair of threaded members is held against rotation by said base of said unit holding member as the other of each pair of threaded members is rotated to lock or release said unit holding member.

2. A device for holding replaceable mops or like units, said device comprising a hollow holder having an elongated downwardly opening mouth and apertured end walls, a pair of separable threaded members interconnected through each of the apertures of said end walls, a unit holding member comprising a base and upturned end portions bearing against the inner faces of said end walls of the holder, said end portions having vertically extending slots open at their upper ends and terminating adjacent the base of said unit holding member and receiving one of each pair of threaded members with the other of each pair of threaded members held against rotation by said base of said unit holding member when said first named threaded members are rotated to lock or release said unit holding member.

3. The device of claim 2, the end walls of said hollow holder being rounded and having on their inner faces flat apertured bearings against which the upturned end portions of said unit holding member are clamped.

WALTER R. HILLS.